Patented Apr. 1, 1930

1,752,933

UNITED STATES PATENT OFFICE

FREDERICK W. SULLIVAN, JR., OF WHITING, INDIANA, ASSIGNOR TO STANDARD OIL COMPANY, OF WHITING, INDIANA, A CORPORATION OF INDIANA

IMMERSION WAX

No Drawing. Application filed February 17, 1928. Serial No. 255,189.

The present invention relates to improvements in waxes, and more particularly in petroleum waxes employed for immersion purposes, and which may, for expedience, be designated as immersion waxes.

In the manufacture of certain products, particularly molded articles, it is customary to heat treat the molded articles by immersion in molten paraffin or other petroleum wax baths. It has been found, however, that such baths rapidly become unadapted for use by the formation of excessive acidity therein.

It has been found that this acid formation may be prevented and the life of immersion wax baths indefinitely prolonged by supplying in the wax certain compounds which are organic aromatic hydroxy or amino compounds in small proportions, say 0.05 to 0.5%. Thus, with an immersion bath of paraffin wax having a melting point of about 115 to 130° F., if 0.2% of gallic acid is added to the wax, the length of time required for reaching a certain acidity, say 10 mg. KOH equivalent per gram of oil, is increased four or five times. Similarly, with the addition of 0.2% diphenylamine, the period required to reach the same acidity is increased approximately three times, and with the same proportion of beta naphthol, the period required to reach the same acidity is increased about six times. The substances above noted produce their results in proportons as low as 0.05 to 0.1% and may be used in proportions as high as 0.35 to 0.5%. Numerous other aromatic compounds of the same character may be employed, as pyrogallol, hydroquinone, paraphenylenediamine and the like. Such substances are hereinafter designated and included as substances having the properties of beta naphthol.

I claim:

1. An immersion wax comprising a paraffin wax and from about 0.05% to about 0.5% of an organic aromatic compound having the properties of beta naphthol.

2. An immersion wax comprising paraffin wax and 0.2% beta naphthol.

3. The method of prolonging the life of an immersion wax bath comprising adding to a bath of paraffin wax from about 0.05% to about 0.5% of an organic aromatic compound of the class including beta naphthol, pyrogallol, diphenylamine, gallic acid, hydroquinone and paraphenylenediamine.

4. An immersion wax comprising a paraffin wax and from about 0.05% to about 0.5% of an organic aromatic compound of the class including beta naphthol, pyrogallol, diphenylamine, gallic acid, hydroquinone, and paraphenylenediamine.

FREDERICK W. SULLIVAN, JR.